March 31, 1959 W. O. MICKEL 2,879,907
POULTRY HOUSE CLEANING DEVICE
Filed June 25, 1957 4 Sheets-Sheet 1
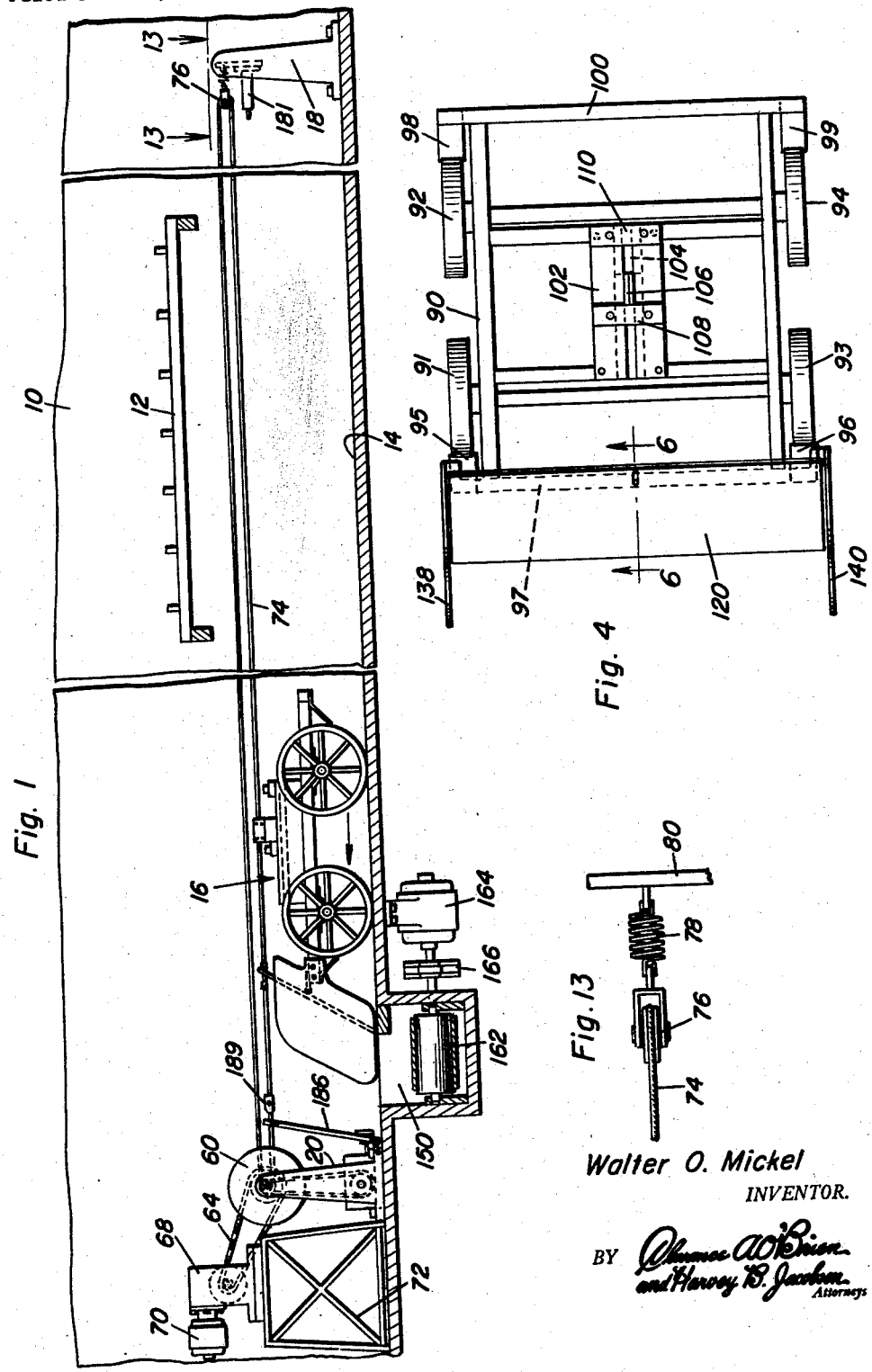
Walter O. Mickel
INVENTOR.

March 31, 1959 W. O. MICKEL 2,879,907
POULTRY HOUSE CLEANING DEVICE
Filed June 25, 1957 4 Sheets-Sheet 2
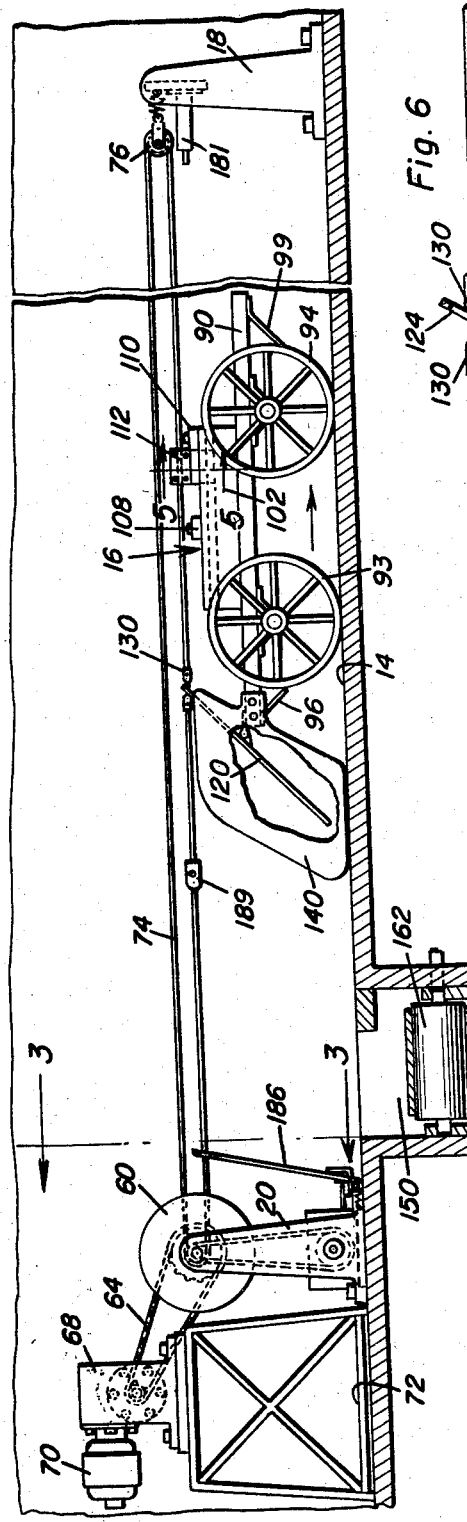
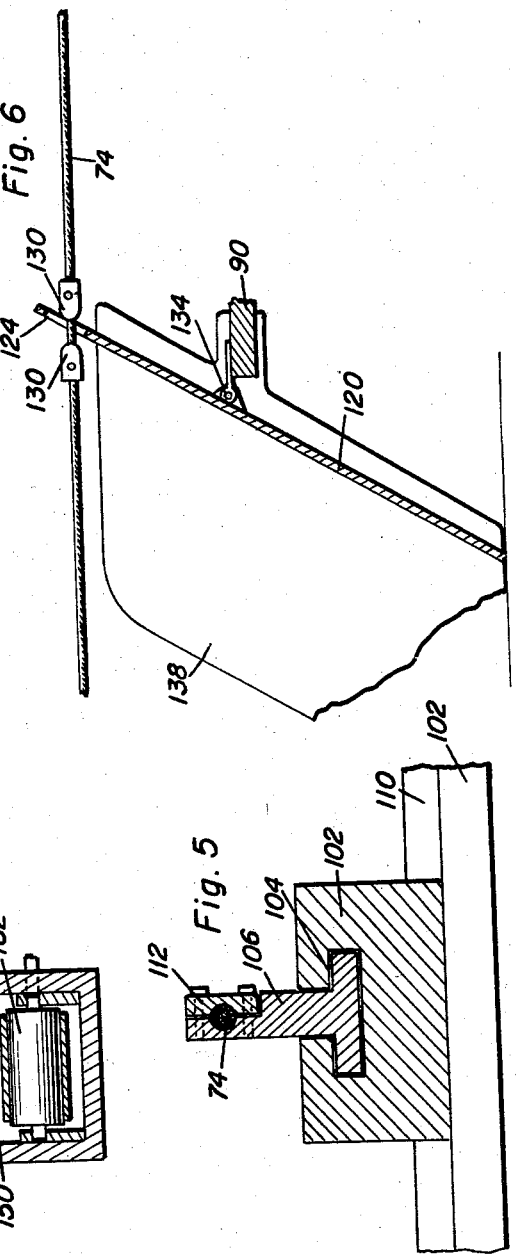
Walter O. Mickel
INVENTOR.

March 31, 1959 W. O. MICKEL 2,879,907
POULTRY HOUSE CLEANING DEVICE
Filed June 25, 1957 4 Sheets-Sheet 3
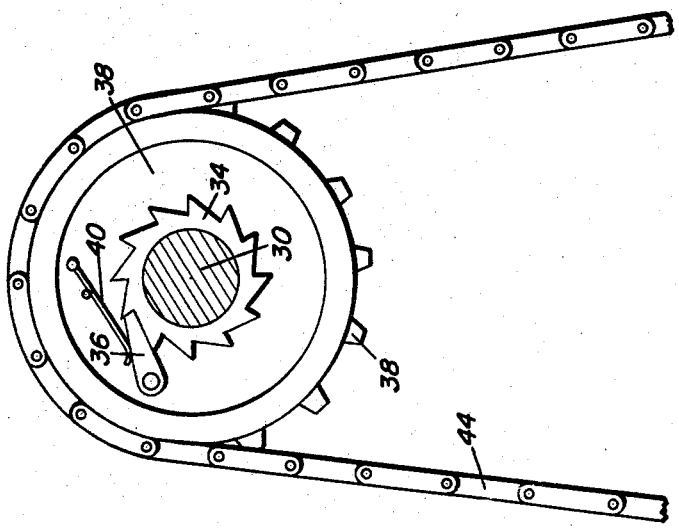
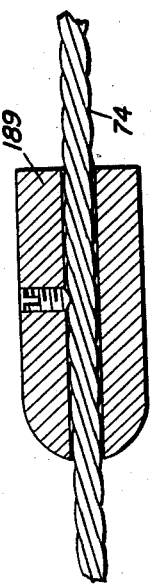
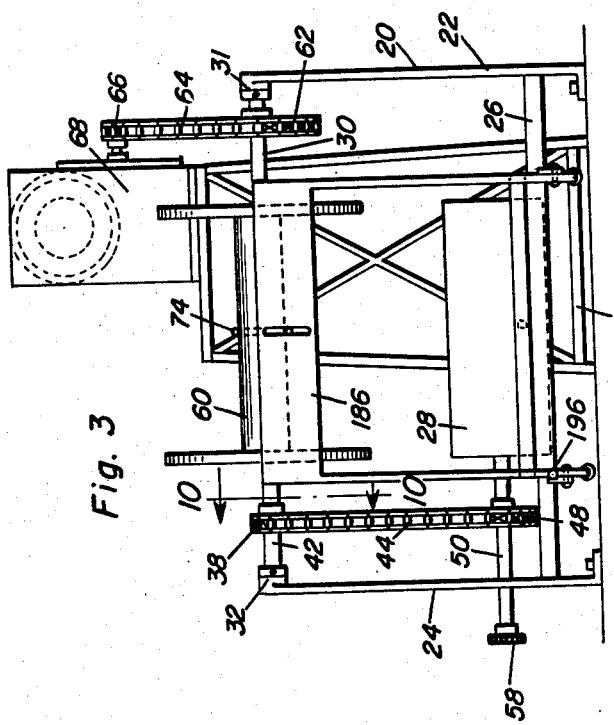
Walter O. Mickel
INVENTOR.
BY *Clarence A. O'Brien*
*and Harvey B. Jacobson*
Attorneys

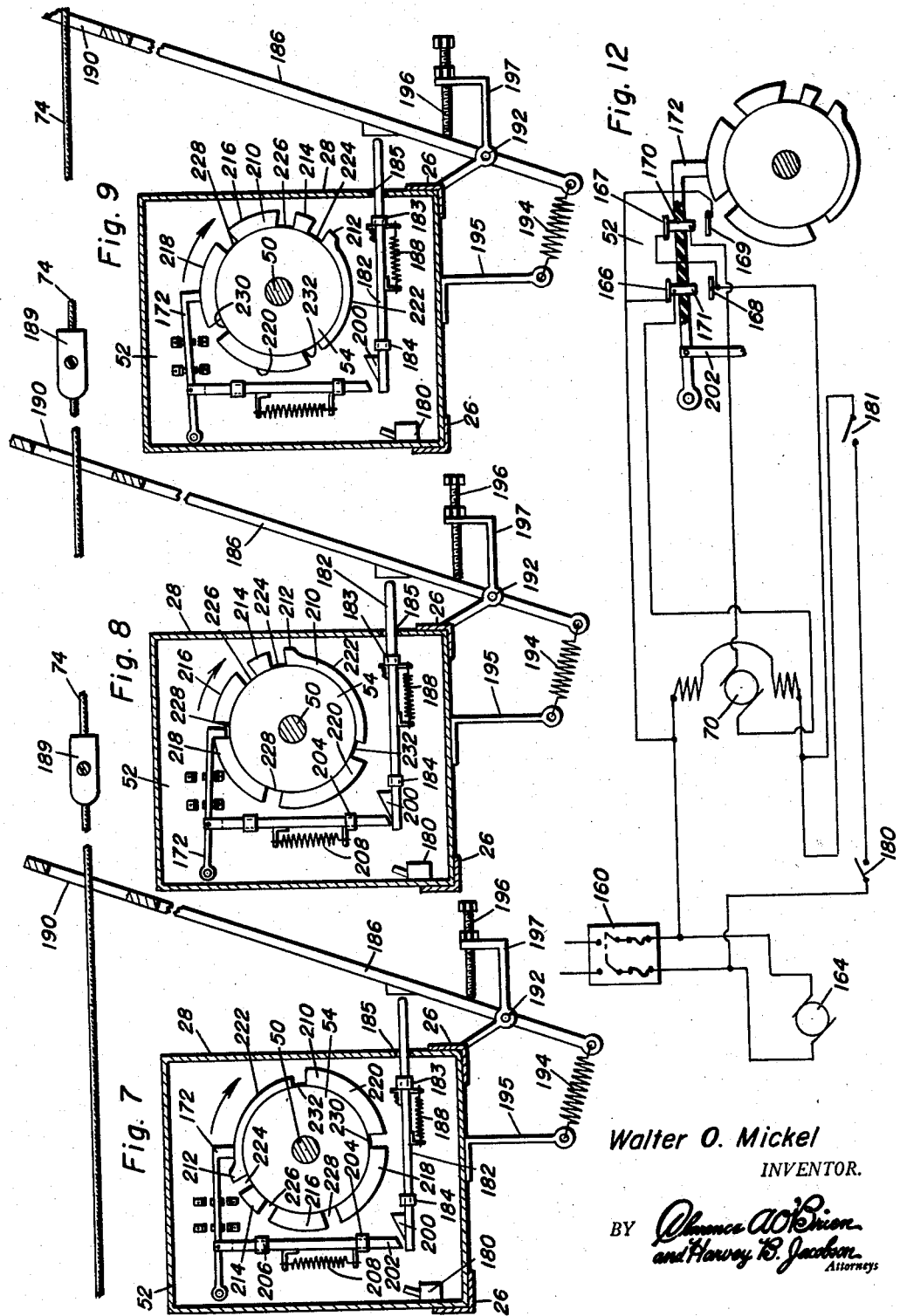

United States Patent Office 2,879,907
Patented Mar. 31, 1959

2,879,907

POULTRY HOUSE CLEANING DEVICE

Walter O. Mickel, Gallupville, N.Y.

Application June 25, 1957, Serial No. 667,840

8 Claims. (Cl. 214—93)

This invention relates to a device for cleaning poultry droppings.

Mechanical devices for cleaning poultry droppings from dropping boards and for scraping them into a pit have been constructed. My poultry droppings cleaning device is not the first mechanical invention to serve this purpose. However, it is an object of this invention to provide a new poultry house cleaning system which is semi-automatic and which possesses the capability of scraping short distances and spilling the droppings into the pit with the distances gradually increasing until the entire surface is cleaned. This is achieved by having a carriage moved in a reciprocatory travel with the length of movement gradually increasing in steps until the entire board is traversed. Then, the apparatus automatically stops and is prepared for another cycle of operation which is initiated by a manual adjustment.

A further object of the invention is to provide a novel switch which has a rotor actuated in response to a rotational input. There are means associated with the rotor to open and close the switch contact enabling a reversible motor to be energized during predetermined timed intervals which are established by a cam on the rotor.

A further object of the invention is to provide a novel apparatus for cleaning the droppings in a poultry or like house, the poultry droppings cleaner operating in sequential movements until the entire dropping board surface is cleaned and operating automatically until a single complete cycle of operation is finished.

One of the important features of the invention is the scraper by which the board surface is cleaned. When the carriage on which the scraper is mounted is moved in one direction that is the cleaning direction, the scraper is moved to the cleaning position. But, when the scraper is returned during the reciprocatory movement in a normal cycle of operation, the scraper is elevated slightly so that it moves over the droppings only to be lowered when the carriage is about to be returned toward the droppings pit.

A further object of the present invention is to provide a novel cleaning apparatus for the droppings in a poultry house, the apparatus including a carriage that moves in a reciprocatory travel with each reciprocation increasing in length until the entire board surface is cleaned, there being a switch constructed and arranged to control the activity of the carriage. The switch has a cam associated with it and the cam controls the path of movement of the switch arm. This arm opens and closes both reverse and forward contacts for a reversible motor which ultimately operates the carriage and which also operates the cam of the switch but in one direction only.

A further object of the invention is to provide a practical device of the character described wherein it is capable of being assembled in practically any poultry house and operate within the confined limits of the available space in the poultry house. Moreover, the poultry droppings cleaning assembly will enable the cleaning operation to be done with little attention. The only thing necessary is to start the equipment and will complete a cycle of operation for scraping the entire dropping board surface before sudden stopping.

Others objects and features will become apparent in following the description of the illustrated form of the invention.

Figure 1 is a longitudinal sectional view showing a part of a poultry house with an embodiment of my invention installed in it;

Figure 2 is a longitudinal sectional view on an enlarged scale of the poultry housing of Figure 1 but showing a second position during the operation, the difference in Figure 1 and Figure 2 being in the direction of travel of the carriage and the location of the scraper during the respective travel illustrations;

Figure 3 is a sectional view taken on the line 3—3 of Figure 2;

Figure 4 is a top view of the carriage of Figure 1;

Figure 5 is an enlarged sectional view taken on the line 5—5 of Figure 2 and showing the means by which the drive cable is attached to the carriage;

Figure 6 is a sectional view on an enlarged scale taken on the line 6—6 of Figure 4 and showing the means by which the scraper is attached to the drive cable and to the carriage;

Figure 7 is an enlarged sectional view showing a part of the main switch and means for operating it, the switch being in the no movement position of the carriage;

Figure 8 is a sectional view like Figure 7 but showing the switch after it has moved to the position at which the carriage in a direction toward the droppings pit after having completed three reciprocations in a complete cycle which has five such reciprocations;

Figure 9 is a sectional view similar to Figure 7 but showing the switch in a position where the carriage is moving in a reverse direction, that is, direction away from the pit, and the carriage is in its fourth reciprocation of a single cycle which includes five reciprocations;

Figure 10 is an enlarged section view showing the one-way drive in the power train and taken on the line 10—10 of Figure 3;

Figure 11 is an enlarged sectional view showing an adjustable stop on the cable and used to actuate the switch lever of Figures 7–9;

Figure 12 is a wiring diagram of the electrical equipment in the apparatus; and

Figure 13 is a sectional view taken on the line 13—13 of Figure 1.

In the accompanying drawings there is a poultry house 10 having a roost or cage 12 schematically represented therein. A dropping board 14 is formed by the bottom of the poultry house or by a separate board placed thereon. In either case, the droppings board is automatically cleaned by carriage 16 which moves thereover.

There are two stands 18 and 20 bolted or otherwise secured to the bottom of the poultry house. Stand 20 has sides 22 and 24 which are connected by braces 26 on which the switch box 28 is disposed. Shaft 30 extends across the sides of stand 20 and is mounted for rotation in bearings 31 and 32. Shaft 30 has a ratchet wheel 34 (Figure 10) secured to it and driven by dog 36 which is pivoted to sprocket 38. Leaf spring 40 reacts on the dog and is carried by sprocket 38 to keep the dog 36 in mesh with the teeth of the ratchet wheel 34. Therefore a one-way clutch is established between the sprocket 38 which rotates freely on shaft 30 by being attached to sleeve 42 (Figure 3) on shaft 30, in one direction only and is drivingly connected with the shaft 30 in the other direction. Chain 44 is entrained around sprocket 38 and the round sprocket 48 which is attached to shaft 50. The shaft 50 constitutes a part of the switch 52 located in box 28 and having a rotor 54 to which shaft 50 is fixed.

A hand knob 58 is attached to the end of the shaft 50 and is located on the exterior of stand 20 so as to be easily accessible to the farmer when setting the shaft to initiate a cycle of operation of the poultry house droppings cleaning equipment.

Drum 60 is attached to shaft 30 and is located between sprocket 38 and sprocket 62. This sprocket is attached to shaft 30 and has a chain 64 engaging it and a sprocket 66. The sprocket 66 is attached to a shaft which protrudes from gear box 68, the latter being actuated from the power of reversible electric motor 70.

The gear box and motor are mounted on a table 72 located behind the stand 20 (Figure 1) and chain 64 extends from the gear box on that table to the sprocket 62 so as to power the shaft 30. An endless cable 74 is attached to drum 60. This cable is also entrained around an idler pulley 76 which is supported by spring 78 on a mounting bracket 80 that extends across the sides of stand 18. Following the power train disclosed in Figure 3, power is delivered from the gear box 68 to the shaft 30 and this rotates the drum 60. If the rotation of shaft 30 is in one direction, chain 44 will rotate shaft 50. However, if the rotation of shaft 30 is in the opposite direction, the overriding clutch (Figure 10) will not drive and therefore, shaft 50 will remain idle.

Carriage 16 has a chassis 90 with four wheels 91, 92, 93 and 94 or skids thereon. Wheel scraping plates 95 and 96 are carried by transverse brace 97 on the chassis and they scrape wheels 91 and 93. Wheel scraping plates 98 and 99 are carried by transverse brace 100 and they scrape wheels 92 and 94. Therefore, as the carriage is propelled from one end of its travel to the other the wheels are automatically scraped and maintained clean. A block 102 is attached to the chassis 90 and has an upwardly opening track 104 in which guide shoe 106 is captive. Fore and aft stops 108 and 110 are attached at the ends of the track 104 and they establish the limits of sliding of the shoe 106 in the track. As shown in Figure 5 the track is T-shaped in cross section and the shoe has a similar cross sectional shape, this holding the shoe captive within the track but enabling it to slide. A cable clamp 112 is at the upper part of the shoe 106 and has the lower flight of cable 74 attached to it. Therefore, as the cable 74 is actuated in either direction, the carriage 16 is propelled in a corresponding direction.

The purpose of having the lost motion in the drive between the cable and the carriage is to enable the scraper 120 to become adjusted in accordance with the necessities for either scraping while the carriage is moving in one direction or riding above and vertically spaced from the droppings on the droppings board. Scraper 120 has a hole 124 near its upper edge. The lower flight of cable 74 is passed through the hole 124, stops 130 and 132 are attached to the lower flight of cable 74 and are spaced to be located on opposite sides of the hole 124. Hinge 134 connects the scraper 120 to the front part of the chassis 90 between the upper and lower edges of the scraper. Therefore, the scraper is capable of being moved about a horizontal hinge axis between its upper and lower edges. Deflectors 138 and 140 are attached to the sides of the chassis 90 and have scraper 120 between them.

The result of this structure is seen by comparison of Figures 1 and 2. When the carriage 16 is driven toward the droppings pin 150, the shoe 106 is capable of sliding in track 104 to the forward limit established by stop 108. The result is that the lower flight of the cable 74 is propelled toward the pit and with respect to the carriage. Hence, stop 130 abouts the rear surface of scraper 120 and behind 120 for causing the scraper to be pivoted forward and bringing the lower edge of the scraper against the droppings board 14. But when the cable 74 is moved in the opposite direction, the lost motion in track 104 enables shoe 106 to strike stop 110 before driving the carriage. This motion of the cable with respect to the carriage enables the stop 132 to abut the front surface of scraper 120 and swing it about the axis of hinge 134. Accordingly the lower edge of the scraper (Figure 2) is lifted from the surface of the dropping board 14 during the reverse movement of the carriage.

Reference is now made to Figures 7–9 and 12. The electrical circuit of the equipment has a fuse box 160, pit 150 has a droppings discharge conveyor 162 in it. This conveyor is operated by an electric motor 164 and the drive is established through a clutch 166. Motor 164 is energized from the fuse box 120. Motor 70 is the reversible motor and is energized from the fuse box. Switch 52 controls the operation of the motor 70 and has a pair of upper contacts 166 and 167 together with a pair of lower contacts 168 and 169 which are engaged by contacts 170 and 171 that are carried by the switch arm 172. When the switch arm is in engagement with the upper contacts 166 and 167 the motor 70 operates in a reverse direction that is, a direction which propels the carriage 16 away from pit 150. When the contacts of switch arm 172 are in engagement with the contacts 168 and 169 the motor is energized so as to propel the carriage 16 in the forward direction that is, the direction toward pit 150.

Safety or limit switches 180 and 181 are connected in series with the field of the motor 70. One switch is located on stand 18 and is arranged to be opened by contact made by a structural part of or on the carriage 16. The other switch 180 is mounted in box 28 and is actuated by a push rod 182. Switches 180 and 181 are emergency switches and are not used during the normal operation of the equipment.

Push rod 182 is mounted for reciprocation in guides 183 and 184 in box 28 and has an end which protrudes through a hole 185 in the side wall of the box. Rocker 186 abuts an end of the push rod 182 to move the same inwardly against the yielding opposition of return spring 188 which is attached to a support in the box and a support on the push rod 182. Stop 189 is attached to the lower flight of cable 74 and passes through an opening 190 in the lever 186. The stop is larger than opening 190 so that when the cable is operated in a direction to propel the carriage toward pit 150. The stop abuts the lever 186 causing it to oscillate about its pivot pin 192 and against the yielding opposition of spring 194. This spring is attached at one end to the lever and attached to a support 195 at the other end. The support is preferably attached to the box 28 although it may be mounted on some other structural part. Adjustable screw 196 that is carried by a mounting bracket 197 has an end in contact with the lever 186 to establish an adjusted rest position for the lever.

When the scraper of the carriage rides over the opening of pit 50 it strikes the lever which is in the form of a frame, and pushes so that it actuates the push rod 182. A cam 200 on the push rod strikes the lower end of another push rod 202 which is mounted in guides 204 and 206 in box 28. Spring 208 yieldingly opposes the movement of the push rod 202 from a center or rest position. The push rod 202 is pivoted to switch arm 174 which has an end resting on cam 210 of rotor 54.

Cam 210 has five lobes 212, 214, 216, 218 and 220 together with a sixth, intermediate lobe 222. Each of the lobes are separated by notches there being notches 224, 226, 228, 230 and 232, respectively. Switch arm 172 is adapted to ride on the surface of the cam 210 in order to program the operation of the carriage by controlling the energization of motor 70.

In use, the operator will close switch 160 to energize conveyor 162. It is assumed that the carriage 16 is in the rest position at which the same is at the pit 150. At this time the rotor 54 is as shown in Figure 7, that is, the switch arm 172 is on the intermediate lobe 122. This maintains the switch 52 in a non-conducting position. To start the cycle of operation the hand knob 58 is turned thereby rotating shaft 50 to bring the cam lobe 212 underneath the switch arm 172 and closing the switch by bringing it to the position shown in Figure 12. Shaft 50 is capable of being rotated without moving the cable 74 since the ratchet one-way clutch (Figure 10) enables this to be done. The ratchet one-way clutch is in the drive position when the carriage is being propelled the carriage moves toward the pit 150 and drives when the carriage moves away from the pit 150. With the switch 52 in the closed position (Figure 9) the winding of motor 70 causing the motor to propel the carriage 16 in the reverse direction (away from pit 150) is energized. It remains energized and the drum 54 remains fixed until the switch arm 174 drops into the first notch 124. By so dropping into the notch 124, the contacts 168 and 169 of switch 52 are closed thereby energizing motor 70 so that it operates in the opposite direction. During its return movement the drum 50 remains stationary due to the ratchet one-way clutch (Figure 10) interposed in the power train. But, when stop 189 contacts the lever 186 and pushes it sufficiently far, the switch arm 172 is lifted from notch 124 thereby reversing the motor 70 and causing the lobe 214 to come beneath the switch arm 172. During this time, the carriage returns over the dropping board 17. But since the lobe 214 is longer than the lobe 212, the carriage 16 will travel further before the reversing operation takes place. The same situation prevails in connection with the reminder of the lobes of the cam 210, each being longer than the preceding one thereby causing the carriage 16 to move back and forth greater distances during the cleaning operation. The final lobe 220 will take in the entire surface 14. In going from notch 232 to the intermediate lobe 222, arm 174 is lifted into such position that switch 52 is in the neutral position and the equipment will require another manual starting by turning knob 58 manually.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In an apparatus to clean droppings from a dropping surface, a pair of stands, an endless member extending between said stands, a carriage, means attaching said carriage to said endless member to propel said carriage back and forth over said surface, means for actuating said endless member through a cycle of movements which includes successive reciprocations of increasing length, said means for connecting said carriage to said endless member including a lost motion connection, a scraper on said carriage, and means responsive to the lost motion in said lost motion connection for lifting and lowering said scraper during the parts of each reciprocation during the reciprocatory cycle of operation of the carriage.

2. In an apparatus to clean droppings from a dropping surface, a pair of stands, an endless member extending between said stands, a carriage, means attaching said carriage to said endless member to propel said carriage back and forth over said surface, means for actuating said endless member through a cycle of movements which includes successive reciprocations of increasing length, said means for connecting said carriage to said endless member including a lost motion connection, a scraper on said carriage, means responsive to the lost motion in said lost motion connection for lifting and lowering said scraper during the parts of each reciprocation during the reciprocatory cycle of operation of the carriage, said means for actuating said cable including a reversible motor, a switch, means including a cam for programming the actuation of said switch, electric circuit connections between said switch and said reversible motor, mechanical means for operating said switch in response to engagement of a part of the carriage with a mechanical lever located in the path of travel of said carriage, emergency switches in addition to the foregoing switch, said emergency switches being located at the ends of the travel of said carriage, said endless member being in the form of a cable, said lost motion connection comprising a shoe to which said cable is secured in a selected adjusted position, a track in said carriage, said shoe being captive in said track between opposite ends of said track.

3. The combination of claim 2 wherein said means for adjusting said scraper in response to lost motion in said connection comprises a pair of spaced stops on said cable, said scraper having an aperture in which said cable is passed, said spaced stops being on each side of said scraper, a hinge intermediate the upper and lower edges of said scraper and attached to said scraper and said carriage so that said spacing stops pivotally actuate said scraper in a forward and aft direction in response to forward and aft directional movement of said carriage.

4. In an apparatus to clean the droppings in a poultry house or cage, a carriage, a scraper, a hinge connecting said scraper to said carriage, means for propelling said carriage over the surface that is to be cleaned, and means active when the carriage is moved in a scraping direction for hingedly adjusting said scraper so that the lower edge contacts the surface and for hingedly adjusting said scraper to lift said lower edge from said surface when said carriage is moved in the opposite direction, the last mentioned means including a pair of stops, said means to propel said carriage including a drive member connected to said carriage for limited lost motion with respect thereto and to which said stops are secured in spaced relationship to each other, said scraper having an opening through which said members pass with said spaced stops on opposite sides thereof.

5. In an apparatus to clean the droppings in a poultry house or cage, a carriage, a scraper, a hinge connecting said scraper to said carriage, means for propelling said carriage over the surface that is to be cleaned, means active when said carriage is moved in a scraping direction for hingedly adjusting said scraper so that the lower edge contacts the surface and for hingedly adjusting said scraper to lift said lower edge from said surface when said carriage is moved in the opposite direction, said means to propel said carriage including a track and a shoe disposed in said track, a drive member connected to said shoe, stops spaced from each other and from said shoe and located in the path of travel of said shoe and said tracks so that said shoe is capable of limited movement with respect to said track, said means for adjusting said scraper including spaced stops on said drive member and located on opposite sides of said scraper so that said scraper is hingedly operated a limited distance in response to the relative motion of said shoe and said track.

6. In a surface cleaning device for a poultry house or the like, the combination of a carriage, an electric motor, a mechanical drive extending between said motor and said carriage, electro-mechanical means for energizing said motor for successively larger durations thereby propelling said carriage through successively larger distances over said surface, means responsive to movement of said carriage in one direction and one end of the travel thereof for actuating said electro-mechanical means in a manner to reverse the movement of said carriage, said carriage responsive means including a lever located in the path of travel of said carriage, a push rod constituting a part of said electro-mechanical means and engaged by said lever to actuate the push rod, means engaged by said lever for establishing a limit of pivotal movement of the lever in one direction, and a spring reacting on said lever and holding said lever against the last mentioned means.

7. In a surface cleaning device for a poultry house or the like, the combination of a carriage, an electric motor, a mechanical drive extending between said motor and said carriage, electro-mechanical means for energizing said motor for successively larger durations thereby propelling said carriage through successively larger distances over said surface, means responsive to movement of said carriage in one direction and one end of the travel thereof for actuating said electro-mechanical means in a manner to reverse the movement of said carriage, said carriage responsive means including a lever located in the path of travel of said carriage, a push rod constituting a part of said electro-mechanical means and engaged by said lever to actuate the push rod, said carriage having a scraper, and means operatively connected to said scraper for raising and lowering said scraper in response to the direction of travel of said carriage.

8. In an apparatus to clean droppings from a dropping surface, a pair of stands, an endless member extending between said stands, a carriage, means attaching said carriage to said endless member to propel said carriage back and forth over said surface, means for actuating said endless member through a cycle of movements which includes successive reciprocations of increasing length, said means for actuating said cable including a reversible motor, a switch, means including a cam for programming the actuating of said switch, electric circuit connections between said switch and said reversible motor, mechanical means for operating said switch in response to engagement of a part of the carriage with a mechanical lever located in the path of travel of said carriage, emergency switches in addition to the foregoing switch, said emergency switches being located at the ends of the travel of said carriage, said endless member being in the form of a cable, said carriage being operatively connected thereto, the connection between said carriage and said cable being in the nature of a lost motion connection, a scraper on said carriage, and means responsive to the lost motion in said lost motion connection for lifting and lowering said scraper into and out of engagement with the dropping surface during the parts of each reciprocation of the cycle of operation of the carriage.

References Cited in the file of this patent

UNITED STATES PATENTS

| | | |
|---|---|---|
| 2,097,909 | Atz | Nov. 2, 1937 |
| 2,467,988 | Petraske | Apr. 19, 1949 |
| 2,491,245 | Bergman | Dec. 13, 1949 |
| 2,529,954 | McCann | Nov. 14, 1950 |
| 2,552,743 | Simpson | May 15, 1951 |
| 2,658,610 | Winslow | Nov. 10, 1953 |